(12) United States Patent
Bruno

(10) Patent No.: US 12,078,379 B2
(45) Date of Patent: Sep. 3, 2024

(54) SPLIT REGENERATION ENVIRONMENTAL CONTROL SYSTEM

(71) Applicant: Hamilton Sundstrand Corporation, Charlotte, NC (US)

(72) Inventor: Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/949,724

(22) Filed: Sep. 21, 2022

(65) Prior Publication Data

US 2024/0003583 A1 Jan. 4, 2024

Related U.S. Application Data

(60) Provisional application No. 63/357,936, filed on Jul. 1, 2022.

(51) Int. Cl.
*F24F 11/86* (2018.01)

(52) U.S. Cl.
CPC .................................. *F24F 11/86* (2018.01)

(58) Field of Classification Search
CPC .......... F24F 11/86; F25D 13/08; F25D 13/02; F25D 13/06; F25D 2013/0618; F25D 2013/0635; F25D 2013/0648; B64D 13/08; B64D 13/02; B64D 13/06; B64D 2013/0618; B64D 2013/0635; B64D 2013/0648
See application file for complete search history.

(56) References Cited

U.S. PATENT DOCUMENTS

| | | | |
|---|---|---|---|
| 6,250,097 B1 | 6/2001 | Lui et al. | |
| 6,457,318 B1 * | 10/2002 | Lui | B64D 13/06 62/402 |
| 6,615,606 B2 | 9/2003 | Zywiak | |
| 10,507,928 B2 | 12/2019 | Marr et al. | |
| 10,543,924 B2 * | 1/2020 | Bruno | F25B 9/10 |

(Continued)

FOREIGN PATENT DOCUMENTS

| | | |
|---|---|---|
| EP | 1386837 A1 | 2/2004 |
| JP | 3218688 B2 | 11/2018 |

OTHER PUBLICATIONS

Extended European Search Report and Written Opinion for European Application No. 23182473.1; Report Mail Date Nov. 20, 2023 (22 Pages).

*Primary Examiner* — Marc E Norman
(74) *Attorney, Agent, or Firm* — CANTOR COLBURN LLP

(57) ABSTRACT

An environmental control system includes an inlet configured to receive a medium and a compressing device fluidly connected to the inlet. The compressing device includes a compressor operably coupled to a turbine, and an outlet of the compressor is fluidly connected to an inlet of the turbine such that the medium is provided to the compressor and the turbine in series. A first air-liquid heat exchanger is arranged in fluid communication with the outlet of the compressor and the inlet of the turbine, a first regeneration heat exchanger is fluidly connected to the outlet of the compressor and to an inlet of the first air-liquid heat exchanger, and a second regeneration heat exchanger is fluidly connected to an outlet of the first air-liquid heat exchanger and to the inlet of the turbine.

15 Claims, 2 Drawing Sheets

(56) References Cited

U.S. PATENT DOCUMENTS

| | | | |
|---|---|---|---|
| 10,850,853 B2 * | 12/2020 | Bruno | F25B 9/10 |
| 10,940,951 B2 * | 3/2021 | Bruno | B64D 13/08 |
| 11,459,110 B2 * | 10/2022 | Bruno | B64D 13/06 |
| 2002/0121103 A1 | 9/2002 | Udobot et al. | |
| 2007/0266695 A1 | 11/2007 | Lui et al. | |
| 2008/0022688 A1 | 1/2008 | Decrisantis et al. | |
| 2019/0300181 A1 * | 10/2019 | Shea | F25B 9/06 |

* cited by examiner

SPLIT REGENERATION ENVIRONMENTAL CONTROL SYSTEM

CROSS-REFERENCE TO RELATED APPLICATIONS

This application claims the benefit of U.S. Provisional Application No. 63/357,936 filed Jul. 1, 2022, the disclosure of which is incorporated herein by reference in its entirety.

BACKGROUND

Exemplary embodiments of the present disclosure relate to the art of environmental control systems, and more particularly to an environmental control system in which an air cycle machine is in a heat exchange relationship with one or more liquid cycle subsystems.

Environmental control systems provide a supply of conditioned air to an enclosure of an aircraft, such as an aircraft cabin and cockpit. Conventional environmental control systems have utilized an air-to-air cycle cooling system which is in a heat exchange relationship with a liquid loop. The liquid loop is typically used to cool other loads within the aircraft, such as avionics packages or the like. Interaction between the air and liquid subsystems may be relatively complex.

In a conventional system, a flow of bleed air is taken from a bleed source, for example, an intermediate or high-pressure stage of a gas turbine engine compressor. The bleed air is provided to a heat exchanger where the temperature is reduced before entering a compressor of an air-cycle machine (ACM). After compression, the air flows to another heat exchanger to reduce the temperature thereof. The cooled air is then routed to a turbine of the ACM where the air expands causing a reduction in the pressure and temperature of the air. The air output from the turbine will then pass through a condenser heat exchanger to remove moisture from the air. The extracted moisture is typically collected in a water collector and the dry air is routed to a cabin, or may be provided to a mixer before being sent to a cabin. Such existing systems includes several components fluidly connected to one another by ducts or conduits.

BRIEF DESCRIPTION

According to an embodiment, an environmental control system includes an inlet configured to receive a medium and a compressing device fluidly connected to the inlet. The compressing device includes a compressor operably coupled to a turbine, and an outlet of the compressor is fluidly connected to an inlet of the turbine such that the medium is provided to the compressor and the turbine in series. A first air-liquid heat exchanger is arranged in fluid communication with the outlet of the compressor and the inlet of the turbine, a first regeneration heat exchanger is fluidly connected to the outlet of the compressor and to an inlet of the first air-liquid heat exchanger, and a second regeneration heat exchanger is fluidly connected to an outlet of the first air-liquid heat exchanger and to the inlet of the turbine.

In addition to one or more of the features described above, or as an alternative, in further embodiments the first regeneration heat exchanger and the second regeneration heat exchanger are integrally formed.

In addition to one or more of the features described above, or as an alternative, in further embodiments the first regeneration heat exchanger is separate from the second regeneration heat exchanger.

In addition to one or more of the features described above, or as an alternative, in further embodiments a volume of the first regeneration heat exchanger is equal to a volume of the second regeneration heat exchanger.

In addition to one or more of the features described above, or as an alternative, in further embodiments a volume of the first regeneration heat exchanger is different from a volume of the second regeneration heat exchanger.

In addition to one or more of the features described above, or as an alternative, in further embodiments comprising an outlet, wherein a conditioned form of the medium is provided to the outlet.

In addition to one or more of the features described above, or as an alternative, in further embodiments a portion of the conditioned form of the medium is used as a heat sink to cool the medium upstream from the turbine.

In addition to one or more of the features described above, or as an alternative, in further embodiments the portion of the conditioned form of the medium used as the heat sink to cool the medium is at a temperature between 0° F. and 35° F.

In addition to one or more of the features described above, or as an alternative, in further embodiments the portion of the conditioned form of the medium is used as the heat sink to cool the medium at both the first regeneration heat exchanger and the second regeneration heat exchanger.

In addition to one or more of the features described above, or as an alternative, in further embodiments a liquid from a liquid loop is used as a heat sink to cool the medium at the first air-liquid heat exchanger.

In addition to one or more of the features described above, or as an alternative, in further embodiments the liquid from the liquid loop is between about 80° F. and about 130° F. at the inlet of the first air-liquid heat exchanger.

In addition to one or more of the features described above, or as an alternative, in further embodiments comprising a second air-liquid heat exchanger arranged downstream from and in fluid communication with an outlet of the turbine, wherein another liquid from another liquid loop is arranged at in a heat transfer relationship with the medium at the second air-liquid heat exchanger.

In addition to one or more of the features described above, or as an alternative, in further embodiments heat is transferred from the another liquid to the medium at the second air-liquid heat exchanger.

According to an embodiment, a method of operating an environmental control system includes compressing a medium to form a compressed medium, cooling the compressed medium at a first regeneration heat exchanger, cooling the compressed medium at a first air-liquid heat exchanger, and cooling the compressed medium at a second regeneration heat exchanger.

In addition to one or more of the features described above, or as an alternative, in further embodiments cooling the compressed medium at the first regeneration heat exchanger occurs prior to cooling the compressed medium at the first air-liquid heat exchanger.

In addition to one or more of the features described above, or as an alternative, in further embodiments cooling the compressed medium at the first air-liquid heat exchanger occurs prior to cooling the compressed medium at the second regeneration heat exchanger.

In addition to one or more of the features described above, or as an alternative, in further embodiments a conditioned form of the medium is used as a heat sink to cool the compressed medium at both the first regeneration heat exchanger and the second regeneration heat exchanger.

In addition to one or more of the features described above, or as an alternative, in further embodiments the conditioned form of the medium is provided to the second regeneration heat exchanger and the first regeneration heat exchanger in series.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
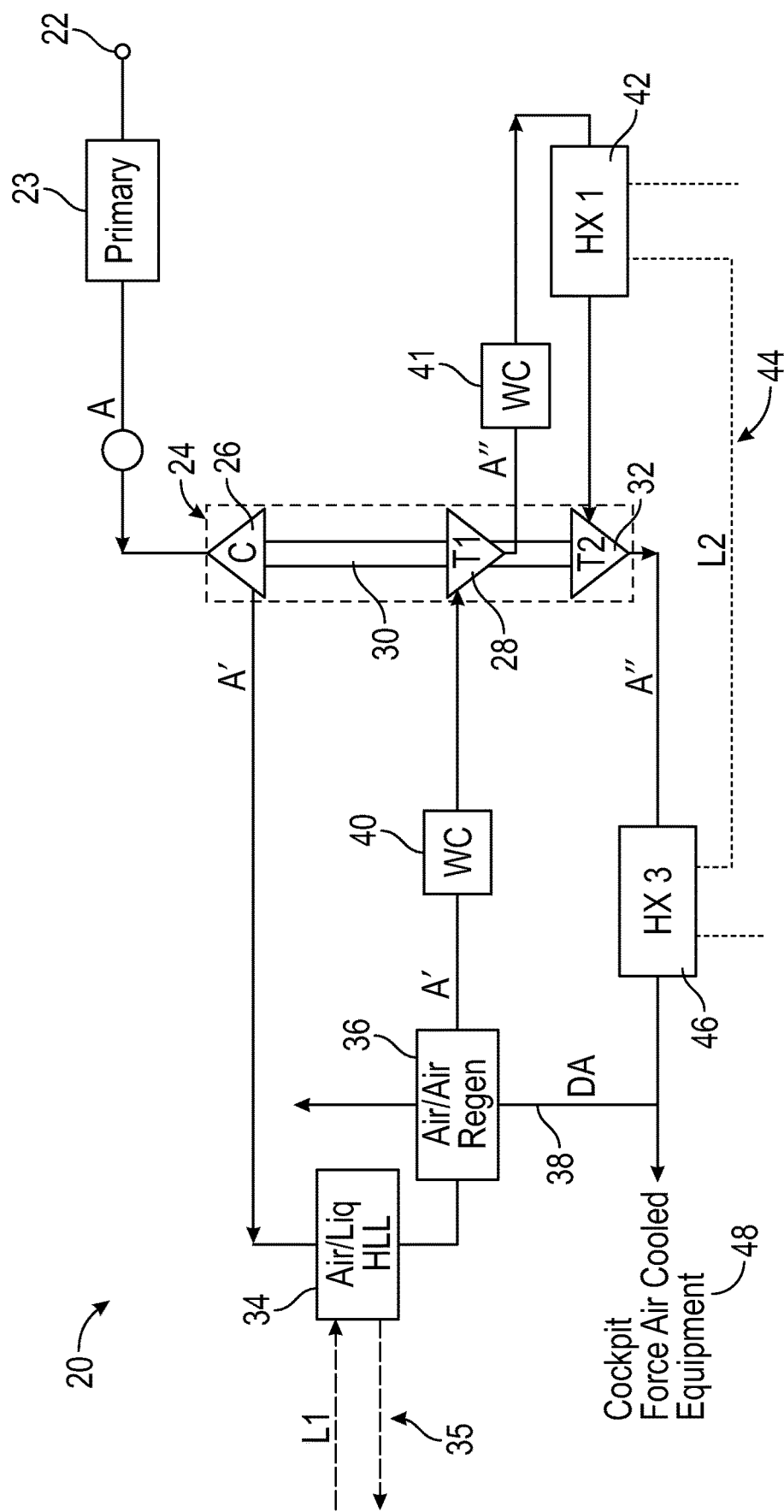
FIG. 1 is a schematic diagram of a portion of an existing environmental control system of an aircraft.

With reference now to FIG. 1, a schematic diagram of a portion of an existing environmental control system (ECS), such as an air conditioning unit or pack for example, is depicted according to non-limiting embodiments as illustrated. Although the environmental control system 20 is described with reference to an aircraft, alternative applications, such as another vehicle for example, are also within the scope of the disclosure. As shown in the figure, the ECS 20 can receive a medium A at an inlet 22. In an embodiment where the environmental control system 20 is used in an aircraft application, the medium A may be bleed air, which is pressurized air originating from, i.e., being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

In another embodiment, the medium A provided to the inlet 22 is fresh air, such as outside air for example. The outside air can be procured via one or more scooping mechanisms, such as an impact scoop or a flush scoop for example. In an embodiment, the medium A is ram air drawn from a portion of a ram air circuit. Generally, the fresh or outside air as described herein is at an ambient pressure equal to an air pressure outside of the aircraft when the aircraft is on the ground and is between an ambient pressure and a cabin pressure when the aircraft is in flight.

The ECS 20 additionally includes at least one compressing device 24. The compressing device 24 is a mechanical device that includes components for performing thermodynamic work on a medium (e.g., extracts work from or applies work to the medium A by raising and/or lowering pressure and by raising and/or lowering temperature). Examples of a compressing device 24 include an air cycle machine, a two-wheel air cycle machine, a three-wheel air cycle machine, a four-wheel air cycle machine, etc. As shown, the compressing device 24, also referred to herein as an air cycle machine, may include a compressor 26 and at least one turbine 28 operably coupled by a shaft 30. In an embodiment, the compressing device 24 includes two turbines 28, 32. In such embodiments, the medium A may be configured to flow through the turbines 28, 32 in series, or alternatively, in parallel.

A compressor 26 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as any of turbines 28 and 32 for example, is a mechanical device that expands a medium and extracts work therefrom (also referred to as extracting energy) to drive the compressor 26 via the shaft 30.

As shown, the medium A provided at the inlet 22 may be cooled within a primary heat exchanger 23 before being delivered to the compressing device 24. The heat sink for the primary heat exchanger 23 can be ram air, engine fan air, or fuel. In the illustrated, non-limiting embodiment, the cooled medium A is provided to an inlet of the compressor 26. The act of compressing the medium A heats and increases the pressure of the medium A.

An inlet of a first heat exchanger 34, such as an air-liquid heat exchanger, is fluidly connected to the outlet of the compressor 26. The compressed medium A' may be cooled within the first air-liquid heat exchanger 34. In an embodiment, the liquid L1 used to cool the compressed medium A' within the first air-liquid heat exchanger 34 is provided from a liquid loop 35 used to condition, for example cool, one or more loads of the vehicle.

From the first air-liquid heat exchanger 34, the cooled compressed medium A' is provided to a first inlet of a regeneration heat exchanger 36. The regeneration heat exchanger 36 may be an air-air heat exchanger configured to utilize excess cooling capacity of the ECS 20 to further cool the compressed medium A'. For example, as will be described in more detail below, part of a conditioned form of the medium ready to be delivered to one or more loads of the vehicle, such as the cockpit for example, may be diverted along a regeneration pathway 38 to a second inlet of the regeneration heat exchanger 36. At the regeneration heat exchanger 36, the compressed medium A' is cooled via thermal exchange with this diverted medium DA. The heated diverted medium DA may then be exhausted overboard or provided to another component of subsystem of the aircraft.

The further cooled compressed medium A' output from a first outlet of the regeneration heat exchanger 36, may have water removed therefrom via a water collector 40, before being provided to an inlet of the turbine 28. Within the turbine 28, energy is extracted from the compressed medium A' to form an expanded medium A". The work extracted from the compressed medium A' in the turbine 28 drives the compressor 26. The pressure downstream of the first turbine 28 is at a middle pressure, a pressure lower than upstream from the first turbine but higher than the pressure of the medium A at the air cycle machine outlet (outlet of turbine 32). In an embodiment, the expanded medium A" is provided to a middle-pressure water separator 41 configured to remove moisture therefrom. The temperature of the expanded medium A" output from the turbine 28 may be above freezing to facilitate the water removal. In an embodiment, the temperature of the expanded medium A" at and downstream from the outlet of the turbine 28 is maintained above freezing when the aircraft is at lower altitudes where water may be present.

In the illustrated, non-limiting embodiment, the expanded medium A" output from the turbine 28 is provided to a second heat exchanger 42, which may also be an air-liquid heat exchanger. At the second air-liquid heat exchanger 42, the expanded medium A" is arranged in a heat transfer relationship with another liquid L2 provided from another liquid loop 44, such as used to cool one or more loads of the vehicle. Although the liquid loop 44 is illustrated and described herein as being distinct from the liquid loop 35 associated with the first air-liquid heat exchanger 34, it should be understood that the same liquid from the same liquid loop may be used to heat the medium A at both heat exchangers 34, 42. In such embodiments, the second air-liquid heat exchanger 42 is arranged downstream from the first air-liquid heat exchanger 34 relative to both the flow of the medium A and the flow of the liquid.

Regardless of the source of the liquid, within the second air-liquid heat exchanger 42, thermal energy is transferred between the expanded medium A" and the liquid L2. In an embodiment, the expanded medium A" is heated by the liquid L2 and the resulting cooler liquid L2 may then directed to one or more heat loads of the liquid loop 44. Because heat is transferred from the medium A to the liquid L of the first liquid loop 35 at the first air-liquid heat exchanger 34, and heat is transferred from the liquid L2 of the second liquid loop 44 to the expanded medium A" at the second air-liquid heat exchanger 42, the first liquid loop 35 may be considered a hot or heating liquid loop and the second liquid cooling loop 44 may be considered a cold or cooling liquid loop 44.

From the second air-liquid heat exchanger 42, the expanded medium A" may be provided to an inlet of the second turbine 32. The energy extracted from the expanded medium A" within the second turbine 32 is also used to drive the compressor 26. The resulting expanded medium A" output from the second turbine 32 is cooler and has a lower pressure than the expanded medium A" provided at the inlet thereof.

From the second turbine 32, the expanded medium A" is provided to a third heat exchanger 46. The third heat exchanger 46 may be configured as an air-liquid heat exchanger with the liquid being the same liquid L used in at least one of the first and second air-liquid heat exchangers 34, 42. In the illustrated, non-limiting embodiment, the third air-liquid heat exchanger 46 is arranged downstream from the second air-liquid heat exchanger relative to the flow of both the medium A and the liquid L2 of liquid loop 44. However, embodiments where the liquid provided to the third air-liquid heat exchanger 46 is different than that provided to both the first air-liquid heat exchanger 34 and the second air-liquid heat exchanger 42 are also contemplated herein.

Within the third air-liquid heat exchanger 46, thermal energy is transferred between the expanded medium A" and the liquid L2. In an embodiment, the expanded medium A" is heated by the liquid L2, and the resulting cooler liquid L2 is then directed to one or more liquid cooled heat loads. In an embodiment, the liquid L2 output from the third heat exchanger has a temperature of about 59° F. The expanded medium A" at the outlet of the third heat exchanger 46 may be controlled between 0° F. and 35° F. depending on the altitude of the aircraft. The conditioned, expanded medium A" leaving the third air-liquid heat exchanger 46 may be provided to one or more loads, illustrated schematically at 48. These loads include, but are not limited to three potential destinations: the cockpit, the forced air-cooled equipment, or the regeneration heat exchanger 36 (as the diverted air DA) previously described herein. It should be understood that the environmental control system 20 illustrated and described herein is intended as an example only, and that an ECS having another suitable flow configuration for conditioning one or more mediums is within the scope of the disclosure.

Figure 2:
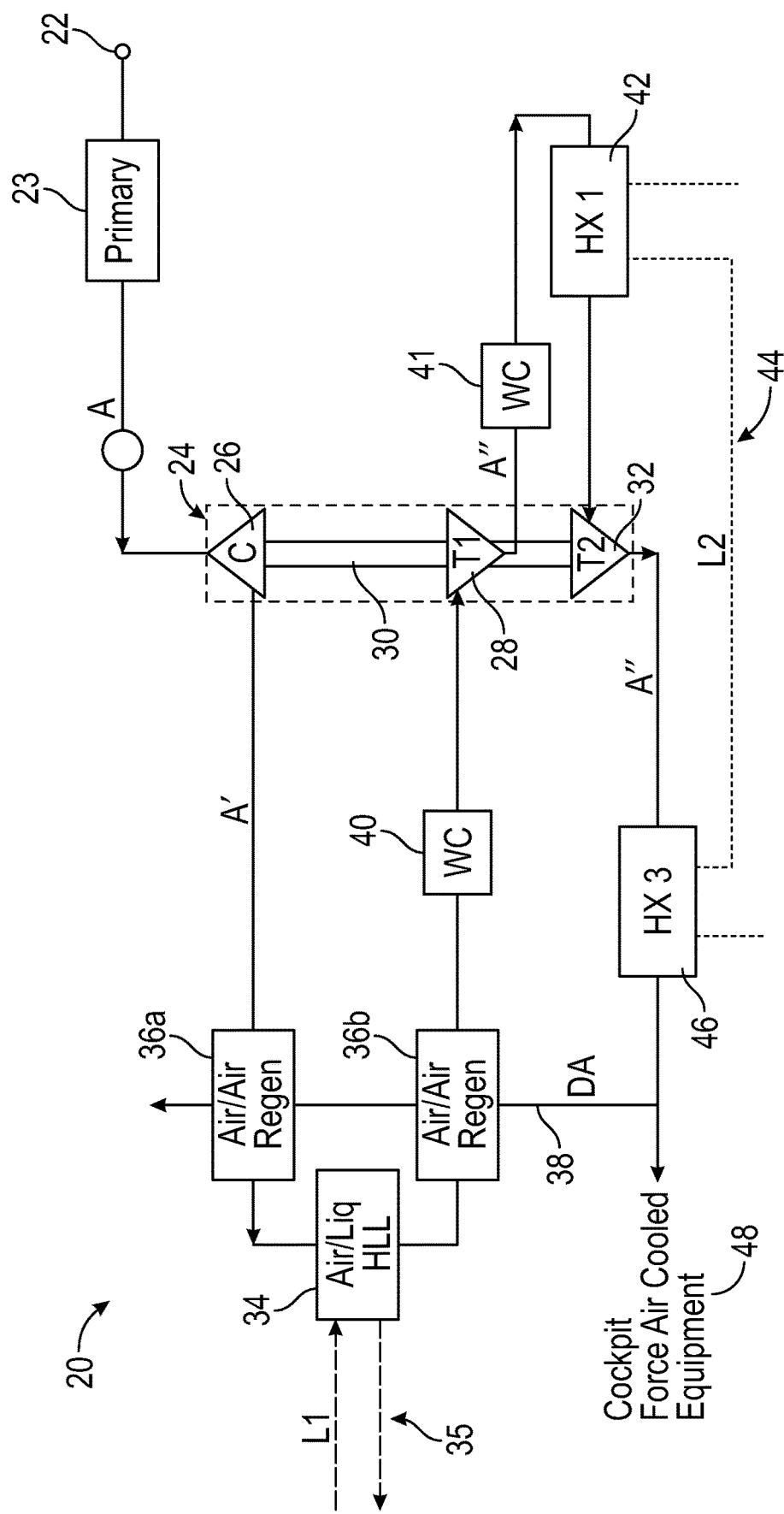
FIG. 2 is a schematic diagram of a portion of an environmental control system of an aircraft according to an embodiment.

With reference now to FIG. 2, a portion of an ECS 20, similar to that shown in FIG. 1 is illustrated. However, the ECS 20 of FIG. 2 is configured to reduce, and in some embodiments minimize, the heat rejected from the compressed medium A' into the liquid loop 35, such as at the first air-liquid heat exchanger 34 for example. In the ECS 20 of FIG. 2, a first regeneration heat exchanger 36a is arranged upstream from the inlet of the first air-liquid heat exchanger 34, and a second regeneration heat exchanger 36b is arranged downstream from the outlet of the first air-liquid heat exchanger 34 relative to the flow of compressed medium A'. Accordingly, the flow of medium A through the ECS 20 of FIG. 2 is substantially identical to that of the system of FIG. 1 except that the compressed medium A' output from the compressor 26 is provided to the first regeneration heat exchanger 36a, the first air-liquid heat exchanger 34 and the second regeneration heat exchanger 36b in series. The first regeneration heat exchanger 36a and the second regeneration heat exchanger 36b may be configured such that the same amount of heat transfer occurs in each. However, embodiments where the first regeneration heat exchanger 36a is configured to perform a greater amount of heat transfer than the second regeneration heat exchanger 36b or vice versa are also contemplated herein.

The diverted medium DA is similarly provided to the second regeneration heat exchanger 36b and the first regeneration heat exchanger 36a in series. Accordingly, the temperature of the diverted air provided to the first regeneration heat exchanger 36a is warmer than the temperature of the diverted air provided to the second regeneration heat exchanger 36b.

Within the first regeneration heat exchanger 36a, the hot compressed medium A' is cooled by the warm diverted air DA output from the second regeneration heat exchanger 36b. The resulting warm compressed medium A' output from the first heat regeneration heat exchanger 36a is provided to the downstream first air-liquid heat exchanger 34. Within the first air-liquid heat exchanger 34, the liquid L1 acts as a heat sink to further cool the warm compressed medium A'. From the first air-liquid heat exchanger 34, the cool compressed medium A' is provided to the second regeneration heat exchanger 36b. At the second regeneration heat exchanger 36b, the cool compressed medium A' is further cooled by the diverted air DA to form a cold compressed air A'. The flow of the cold compressed air A' through the downstream components of the ECS 20 is substantially identical to that described with respect to FIG. 1 above.

In an embodiment, the first regeneration heat exchanger 36a and the second regeneration heat exchanger 36b are formed by splitting the regeneration heat exchanger 36 of FIG. 1 into two parts. Accordingly, the volume of the first and second regeneration heat exchangers 36a, 36b, in combination, may be the same or substantially identical to the volume of the regeneration heat exchanger 36 of the system of FIG. 1. However, in some embodiments, the total combined volume of the first and second regeneration heat exchangers 36a, may be different, for example larger than the volume of the regeneration heat exchanger 36 of the baseline system of FIG. 1. Further, the volume of the first regeneration heat exchanger 36a may be substantially equal to the second regeneration heat exchanger 36b or may be different therefrom.

Although the first and second regeneration heat exchangers 36a, 36b are illustrated schematically as being separate from one another, it should be appreciated that the first and second regeneration heat exchangers 36a, 36b may be integrally formed with one another. In such embodiments, ducting, baffles, or other suitable components may be used to form a first inlet and a first outlet for the portion of the heat exchanger configured as the first regeneration heat exchanger 36a and a second inlet and second outlet for the portion of the heat exchanger configured as the second regeneration heat exchanger 36b. However, embodiments where the first and second regeneration heat exchangers 36a, 36b are two separate and remotely located heat exchangers are also contemplated herein. In such embodiments, the shape and size of the first and second regeneration heat exchangers 36a, 36b may vary from the shape and size of the regeneration heat exchanger 36 of the system of FIG. 1.

The amount of cooling of the compressed medium A' that occurs at the first air-liquid heat exchanger 34 may be at least partially determined by the temperature and properties of the liquid L1 of the liquid loop 35. In an embodiment, the liquid L1 provided to the first air-liquid heat exchanger 34 has a temperature between about 80 F and about 130 F. Further, the temperature of the diverted air DA provided to the regeneration heat exchanger 36 (FIG. 1) or the second regeneration heat exchanger 36b (FIG. 2) is lower than the temperature of the liquid L1. In the illustrated, non-limiting embodiment of FIG. 2, the temperature of the diverted air DA at the outlet of the first regeneration heat exchanger 36a and exhausted overboard may be 300° F. or hotter. The temperature of the diverted air DA at a location downstream from the regeneration heat exchanger 36 of FIG. 1, however, is less than 300 F. The temperature of the compressed medium A' discharged from the compressor 26 is significantly hotter than the temperature of the compressed medium A' at the outlet of the first air-liquid heat exchanger 34. Accordingly, the increase in the temperature of the diverted air DA exhausted overboard from the ECS 20 occurs because the diverted air is used as a heat sink in the first regeneration heat exchanger 36a, at a position upstream from the first air-liquid heat exchanger 34.

By positioning an air-air regeneration heat exchanger 36a, 36b both upstream and downstream from the first air-liquid heat exchanger 34, the thermodynamic efficiency of the ECS 20 is improved. The system may maintain or even lower the temperature of the compressed medium A' provided to the turbine while maintaining or improving the cooling performance relative to an ECS having a single regeneration heat exchanger located downstream from the first air-liquid heat exchanger 34.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system comprising:
    an inlet configured to receive a medium;
    an outlet configured to receive a conditioned form of the medium;
    a compressing device fluidly connected to the inlet, the compressing device including a compressor operably coupled to a turbine, the compressor having a compressor inlet and a compressor outlet and the turbine having a turbine inlet and a turbine outlet, wherein the compressor outlet is fluidly connected to the turbine inlet such that the medium is provided to the compressor and the turbine in series;
    a first air-liquid heat exchanger arranged in fluid communication with the compressor outlet and the turbine inlet;
    a first regeneration heat exchanger fluidly connected to the compressor outlet and to an inlet of the first air-liquid heat exchanger; and
    a second regeneration heat exchanger fluidly connected to an outlet of the first air-liquid heat exchanger and to the turbine inlet;
    wherein a portion of the conditioned form of the medium is used as a heat sink to cool the medium at both the first regeneration heat exchanger and the second regeneration heat exchanger.

2. The environmental control system of claim 1, wherein the first regeneration heat exchanger and the second regeneration heat exchanger are integrally formed.

3. The environmental control system of claim 1, wherein the first regeneration heat exchanger is separate from the second regeneration heat exchanger.

4. The environmental control system of claim 1, wherein a volume of the first regeneration heat exchanger is equal to a volume of the second regeneration heat exchanger.

5. The environmental control system of claim 1, wherein a volume of the first regeneration heat exchanger is different from a volume of the second regeneration heat exchanger.

6. The environmental control system of claim 1, wherein the portion of the conditioned form of the medium used as the heat sink to cool the medium is at a temperature between 0° F. and 35° F.

7. The environmental control system of claim 1, wherein a liquid from a liquid loop is used as a heat sink to cool the medium at the first air-liquid heat exchanger.

8. The environmental control system of claim 7, wherein the liquid from the liquid loop is between about 80°F and about 130° F. at the inlet of the first air-liquid heat exchanger.

9. The environmental control system of claim 7, further comprising:
    a second air-liquid heat exchanger arranged downstream from and in fluid communication with an outlet of the turbine;
    wherein another liquid from another liquid loop is arranged at in a heat transfer relationship with the medium at the second air-liquid heat exchanger.

10. The environmental control system of claim 9, wherein heat is transferred from the another liquid to the medium at the second air-liquid heat exchanger.

11. A method of operating an environmental control system comprising:
   compressing a medium to form a compressed medium;
   cooling the compressed medium at a first regeneration heat exchanger using a flow of a second medium;
   cooling the compressed medium at a first air-liquid heat exchanger; and
   cooling the compressed medium at a second regeneration heat exchanger using the flow of the second medium.

12. The method of claim 11, wherein cooling the compressed medium at the first regeneration heat exchanger occurs prior to cooling the compressed medium at the first air-liquid heat exchanger.

13. The method of claim 12, wherein cooling the compressed medium at the first air-liquid heat exchanger occurs prior to cooling the compressed medium at the second regeneration heat exchanger.

14. The method of claim 11, wherein a conditioned form of the medium is used as the second medium to cool the compressed medium at both the first regeneration heat exchanger and the second regeneration heat exchanger.

15. The method of claim 11, wherein the conditioned form of the medium is provided to the second regeneration heat exchanger and the first regeneration heat exchanger in series.

\* \* \* \* \*